United States Patent
Jo et al.

(10) Patent No.: US 12,345,965 B2
(45) Date of Patent: Jul. 1, 2025

(54) DRIVER CIRCUIT

(71) Applicant: Nippon Telegraph and Telephone Corporation, Tokyo (JP)

(72) Inventors: Teruo Jo, Tokyo (JP); Munehiko Nagatani, Tokyo (JP); Hideyuki Nosaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 152 days.

(21) Appl. No.: 18/006,124

(22) PCT Filed: Jul. 21, 2020

(86) PCT No.: PCT/JP2020/028256
§ 371 (c)(1),
(2) Date: Jan. 19, 2023

(87) PCT Pub. No.: WO2022/018825
PCT Pub. Date: Jan. 27, 2022

(65) Prior Publication Data
US 2023/0288735 A1    Sep. 14, 2023

(51) Int. Cl.
*H02H 9/04*    (2006.01)
*G02F 1/01*    (2006.01)

(52) U.S. Cl.
CPC .............. *G02F 1/0121* (2013.01); *G02F 1/01* (2013.01); *H02H 9/04* (2013.01); *H02H 9/044* (2013.01)

(58) Field of Classification Search
CPC    H02H 3/20; H02H 9/04; H02H 9/046; H02H 9/044; H03K 3/00; G02F 1/0121
USPC ......................................................... 361/91.1
See application file for complete search history.

(56) References Cited

U.S. PATENT DOCUMENTS

| | | | | |
|---|---|---|---|---|
| 6,005,438 A | * | 12/1999 | Shing | H03K 17/662 327/309 |
| 6,590,422 B1 | * | 7/2003 | Dillon | H04L 25/028 326/82 |
| 2016/0070123 A1 | * | 3/2016 | Tatsumi | G02F 1/0121 359/276 |

OTHER PUBLICATIONS

Jyo et al., "A 48GHz BW 225mW/ch Linear Driver IC with Stacked Current-Reuse Architecture in 65nm CMOS for Beyond-400Gb/s Coherent Optical Transmitters," ISSCC 2020, Session 12, Advanced Optical Communication Circuits, 12.3, Feb. 18, 2020, 3 pages.

* cited by examiner

*Primary Examiner* — Danny Nguyen
(74) *Attorney, Agent, or Firm* — Slater Matsil, LLP

(57) ABSTRACT

An embodiment includes an output circuit with transistors and a withstand voltage protection circuit. The withstand voltage protection circuit includes resistors connected between an output signal terminal on the positive phase side and an output signal terminal on the negative phase side. A switch includes an NMOS transistor having a gate terminal connected to the connection point of the resistors, a drain terminal connected to the bias voltage, and a source terminal connected to the base terminal of the transistor.

11 Claims, 5 Drawing Sheets

DRIVER CIRCUIT

CROSS-REFERENCE TO RELATED APPLICATIONS

This application is a national phase entry of PCT Application No. PCT/JP2020/028256, filed on Jul. 21, 2020, which application is hereby incorporated herein by reference.

TECHNICAL FIELD

The present invention relates to a driver circuit for driving an optical modulator.

BACKGROUND

A modulator driver circuit used in a transmitter for optical communication is used to drive an optical modulator in the optical transmitter and serves to amplify the amplitude intensity of an electric signal to be transmitted to a level at which the optical modulator can be driven. Such a driver circuit is required to have a protection function for preventing a voltage equal to or higher than the withstand voltage from being applied to a transistor used in the circuit. A case where a voltage equal to or higher than the withstand voltage is likely to be applied to the transistor is a case where a power supply is turned on or off.

A conventional countermeasure against withstand voltage at the time of turning on or off the power supply will be described. FIG. 4 is a view showing a configuration of a conventional driver circuit. The driver circuit 100 drives a Mach-Zehnder optical Modulator (MZM) 200 composed of an optical waveguide (not shown), electrodes 201 and 202, and resistors R200 and R201. The driver circuit 100 comprises: an input buffer 101 to which a differential signal for driving the MZM 200 is input, a Gain Control Amplifier (GCA) 102 for adjusting gain so that the amplitude of the differential signal output from the input buffer 101 becomes constant, a preamplifier 103 for amplifying differential signal output from the GCA 102, an open collector type output circuit 104 for driving the MZM 200 according to the differential signal output from the preamplifier 103, DC cut capacitors C100, C101, and input termination resistors R100, R101.

FIG. 5 is a diagram showing a configuration of the output circuit 104. The output circuit 104 is composed of transistors Q100 to Q104.

The driver circuit generally operates with a plurality of power supply voltages to reduce power consumption. For example, as shown in FIG. 4, the power supply voltage VCC of the driver circuit 100 and the power supply voltage VDR of the MZM 200 may be divided (see NPL 1).

A power supply voltage VDR of the MZM 200 is applied to an output signal terminal Voutp of the driver circuit 100 (a non-inverted output terminal Vop of the output circuit 104) via the resistor R200 and the electrode 201. Similarly, a power supply voltage VDR is applied to an output signal terminal Voutn (an inverted output terminal Von output circuit 104) of the driver circuit 100 via a resistor R201 and an electrode 202. Thus, the power supply voltage of the output circuit 104 is supplied from the MZM 200 side.

On the other hand, a common voltage of input transistors Q100 and Q102 of an output circuit 104, a bias voltage VB1 applied to a base terminal of output transistors Q101 and Q103, and a bias voltage Vcs applied to a base terminal of a current source transistor Q104 are generated from a power supply voltage VCC of the driver circuit 100.

In the case where the countermeasure against withstand voltage is not taken, for example, when the power supply of the MZM 200 is in an off state and only the power supply of the driver circuit 100 is turned on state, a voltage equal to or higher than the withstand voltage is applied to input transistors Q100 and Q102, output transistors Q101 and Q103 of the output circuit 104, and then the transistors Q100 to Q103 may be broken. Therefore, in the conventional art, for example, the power supply voltages of both the driver circuit 100 and the MZM 200 are gradually increased until the voltage reaches a desired voltage when the power supply is turned on, so that a voltage equal to or higher than the withstand voltage is not applied to the transistors Q100 to Q103. On the contrary, when the power supply is cut off, the power supply voltages of the driver circuit 100 and the MZM 200 are gradually lowered.

However, such a conventional countermeasure against withstand voltage at the time of turning on or off the power supply has a problem that the power supply sequence becomes complicated. When the power supply voltages of the driver circuit 100 and the MZM 200 are gradually increased manually, the number of times of operating the power supply is large, and a long time is required to reach a desired voltage. In addition, when the power supply voltages of the driver circuit 100 and the MZM 200 are automatically and gradually increased, it is necessary to separately manufacture a power supply control circuit and a program, which leads to an increase of circuit area and cost.

CITATION LIST

Non Patent Literature

NPL 1 Teruo Jyo, Munehiko Nagatani, Josuke Ozaki, Mitsuteru Ishikawa, Hideyuki Nosaka, "A 48 GHz BW 225 mW/ch Linear Driver IC with Stacked Current-Reuse Architecture in 65 nm CMOS for Beyond-400 Gb/s Coterent Optical Transmitters", 2020 IEEE International Solid-State Circuits Conference (ISSCC), San Francisco, CA, USA, 2020, pp. 212-214, doi: 10.1109/ISSCC 19947.2020.9063027

SUMMARY

Technical Problem

The embodiments of the present invention are accomplished to solve above problem, and an object of the embodiments of the present invention is to provide a driver circuit capable of simplifying a power supply sequence more than before.

Solution to Problem

A driver circuit of embodiments of the present invention includes an open collector type output circuit configured to drive an optical modulator connected to a first output signal terminal on a positive phase side and a second output signal terminal on a negative phase side of the driver circuit, the output circuit including a first transistor and a second transistor having a base terminal to which a differential signal for driving the optical modulator to be inputted; a third transistor having a base terminal connected to a first bias voltage, a collector terminal connected to the first output signal terminal, and an emitter terminal connected to a collector terminal of the first transistor; a fourth transistor having a base terminal connected to the first bias voltage, a collector terminal connected to the second output signal terminal, and an emitter terminal connected to a collector terminal of the second transistor; a fifth transistor having a collector terminal connected to the emitter terminals of the first and second transistors, an emitter terminal connected to ground, configured to flow currents through the first, second, third, and fourth transistors in accordance with a second bias voltage applied to the base terminal; and a withstand voltage protection circuit configured to control currents flowing through the first, second, third, and fourth transistors in accordance with a common voltage between the first output signal terminal and the second output signal terminal.

Advantageous Effects of Invention

According to embodiments of the present invention, a withstand voltage protection circuit for controlling currents flowing through the first, second, third and fourth transistors in accordance with a common voltage between the first output signal terminal and the second output signal terminal is provided in the output circuit, the power supply sequence of the driver circuit and the optical modulator can be simplified more than before. Further, since the present invention does not require a complicated power supply control circuit or program, it is possible to realize withstand voltage protection of the transistor of the output circuit with a small area and at a low cost.

DETAILED DESCRIPTION OF ILLUSTRATIVE EMBODIMENTS

First Example

Figure 1:
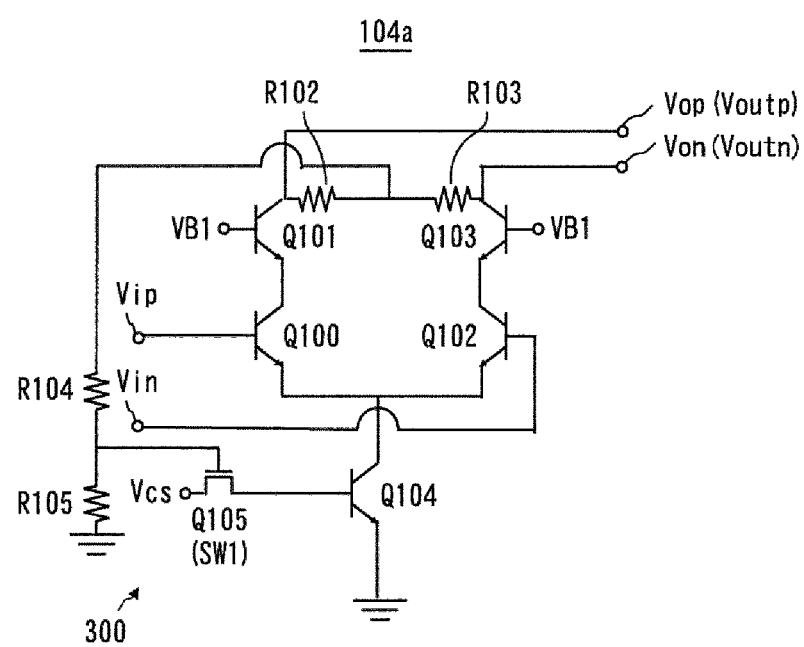
FIG. 1 is a diagram showing a configuration of an output circuit of a driver circuit according to a first example of the present invention.
Figure 4:
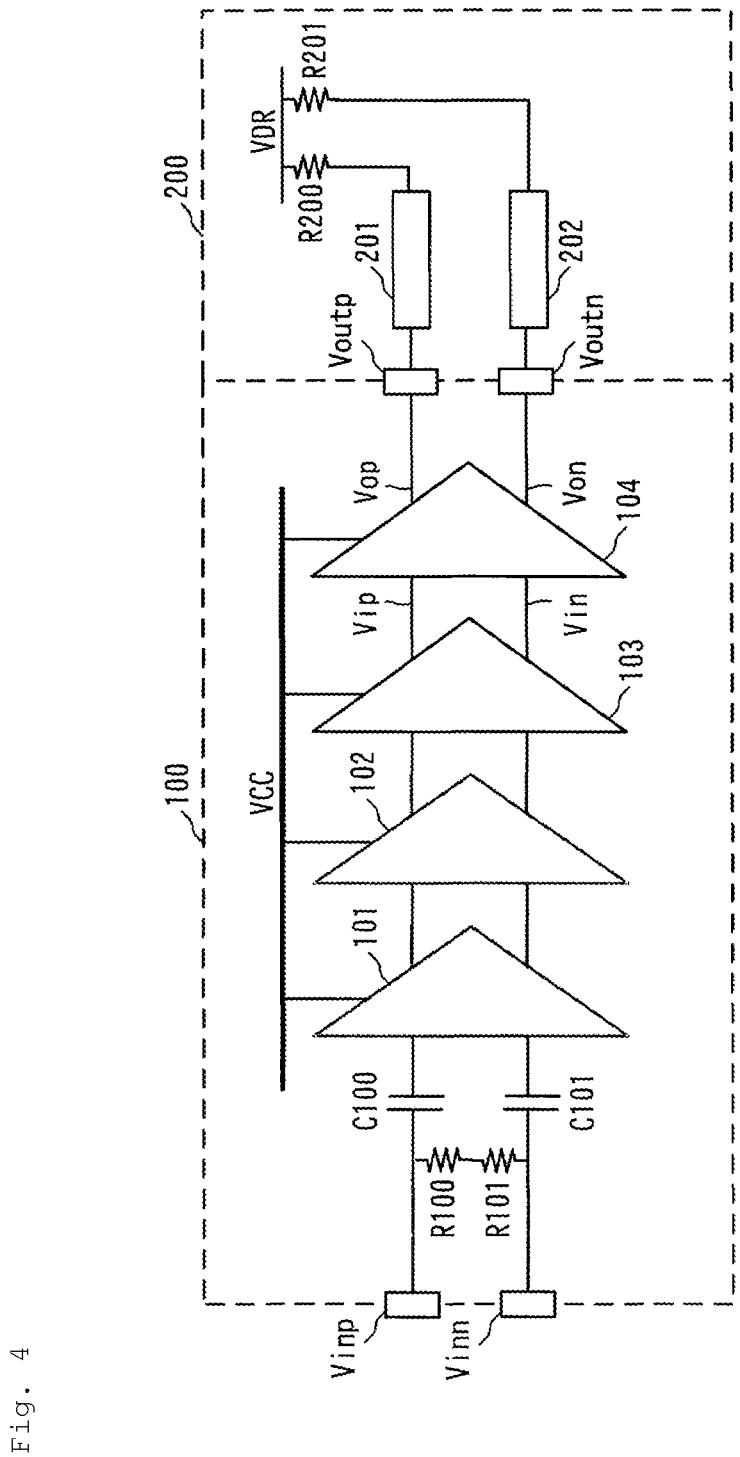
FIG. 4 is a view showing a configuration of a conventional driver circuit.
Figure 5:
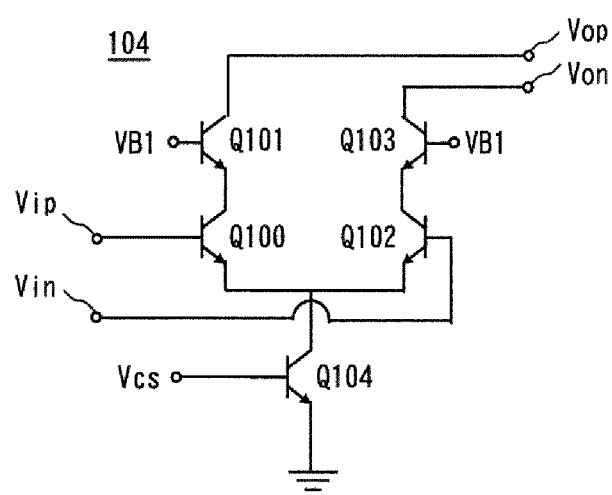
FIG. 5 is a circuit diagram showing a configuration of the output circuit of the conventional driver circuit.

Hereinafter, an example of the present invention will be described with reference to the drawings. FIG. 1 is a view illustrating a configuration of the output circuit of the driver circuit according to the first example of the present invention. In this example, since the driver circuit 100 shown in FIG. 4 uses an output circuit 104a instead of the output circuit 104, the driver circuit 100 and the MZM 200 will be described with reference to the reference numerals shown in FIG. 4.

The output circuit 104a includes: an input transistor Q100 having base terminal connected to a non-inverting input terminal Vip of the output circuit 104a; an output transistor Q101 having base terminal connected to the bias voltage VB1, collector terminal connected to a non-inverting output terminal Vop (an output signal terminal Voutp in the positive phase side of the driver circuit 100) of the output circuit 104a, and emitter terminal connected to the collector terminal of the input transistor Q100; an input transistor Q102 having base terminal connected to the inverted input terminal Vin of the output circuit 104a; an output transistor Q103 having base terminal connected to the bias voltage VB1, collector terminal connected to the inverted output terminal Von (an output signal terminal Voutn in the negative phase side of the driver circuit 100) of the output circuit 104a, and emitter connected to the collector terminal of the input transistor Q102; a transistor for a current source Q104 having collector connected to the emitter terminal of the input transistors Q100, Q102 and emitter connected to ground; resistors R102, R103 connected in series between the output signal terminal Voutp and the output signal terminal Voutn; a resistor R104 having one end connected to the connection point of the resistors R102, R103; a resistor R105 having one end connected to another end of the resistor R104 and the other end connected to ground; and NMOS transistor Q105 having gate terminal connected to the connection point of resistors R104, R105, drain terminal connected to the bias voltage Vcs, and source terminal connected to the base terminal of the current source transistor Q104.

An NMOS transistor Q105 constitutes a switch SW1 connected between the bias voltage VCS and the base terminal of the current source transistor Q104. The switch SW1 is turned off when the connection point of the resistor R102, R103 is a floating or ground voltage, and turned on when the connection point of the resistor R102, R103 is higher than the ground voltage. The resistor R102 to R105 and the switch SW1 constitute a withstand voltage protection circuit 300.

The power supply voltage VCC of the driver circuit 100, the power supply voltage VDR of the MZM 200, and the bias voltage VB1, Vcs (VCC≥VB1>Vcs) are positive voltages. In this example, a switch SW1 for turning on/off the application of the bias voltage VCS to the base terminal of the current source transistor Q104 is provided, and the switch SW1 is controlled according to the common voltage of the differential output signal terminal Voutp and Voutn (the output terminal Vop, Von of the output circuit 104a) of the driver circuit 100.

A control signal applied to a control terminal (a gate terminal of an NMOS transistor Q105) of the switch SW1 is the signal in which the common voltage detected by resistors R102, R103 inserted between an output signal terminal Voutp and an output signal terminal Voutn is divided by the resistors R104, R105 and shifted to a low voltage side. The reason why the common voltage is shifted to the low voltage side by resistance division is that the withstand voltage of the NMOS transistor Q105 used as the switch SW1 is lower than the withstand voltage of the bipolar transistor Q100 to Q104. However, when there is no problem in the withstand voltage of the switch SW1, the resistor R104 and R105 are not provided, and the connection point of the resistors R102, R103 may be directly connected to the control terminal of the switch SW1.

The withstand voltage protection of the present example functions as follows. For example, when only the power supply of the driver circuit 100 is on and the power supply of the MZM 200 is off, a differential output signal terminal Voutp and Voutn of the driver circuit 100 is a floating or ground voltage. In this state, since the control signal applied to the gate terminal of the NMOS transistor Q105 becomes low, the NMOS transistor Q105 is turned off. Therefore, since the bias voltage VCS is not supplied to the current source transistor Q104 and no current flows to the transistor Q100 to Q103 of the output circuit 104a, no voltage exceeding the withstand voltage is applied to the transistor Q100 to Q103.

When the power supply of the MZM 200 is turned on while the power supply of the driver circuit 100 is on, the common voltage of the differential output signal terminal Voutp and Voutn of the driver circuit 100 rises, a control signal applied to the gate terminal of the NMOS transistor Q105 becomes high, and the NMOS transistor Q105 is turned on. In this state, a bias voltage Vcs is supplied to a current source transistor Q104, and a current in a normal operation flows to a transistor Q100 to Q103 of the output circuit 104a. Therefore, a voltage equal to or higher than the withstand voltage is not applied to the transistor Q100 to Q103.

In this example, the power supply sequence can be simplified more than in the prior art. For example, an operation for turning on the power supply of the MZM 200 may be performed simply after turning on the power supply of the driver circuit 100. When the power supply is cut off, the power supply of the MZM 200 is turned off and then the power supply of the driver circuit 100 is turned off. Further, in the present example, since a complicated power supply control circuit or program is not required, the withstand voltage protection can be realized with a small area and at a low cost.

Second Example

Figure 2:
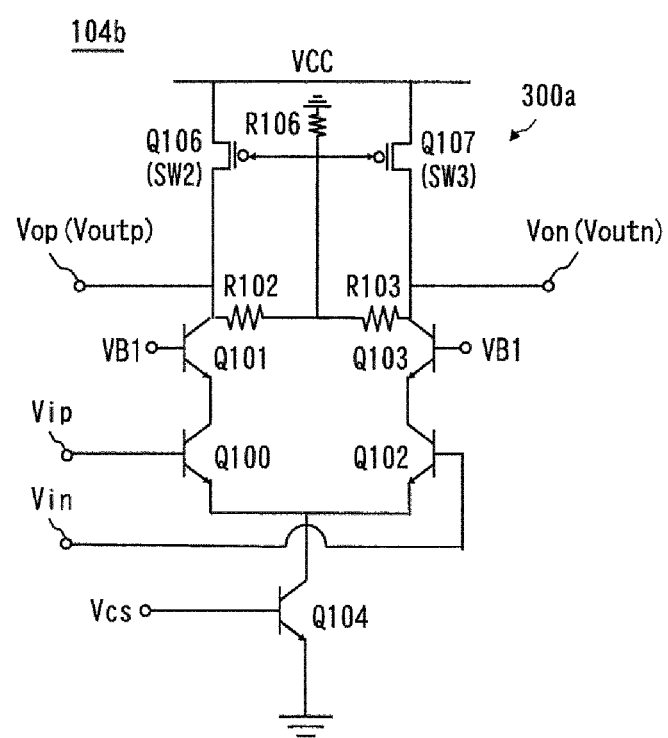
FIG. 2 is a view illustrating a configuration of the output circuit of the driver circuit according to a second example of the present invention.

Next, a second example of the present invention will be described. FIG. 2 is a view illustrating a configuration of an output circuit of the driver circuit according to the second example of the present invention. Since the output circuit 104b is used in place of the output circuit 104 in the driver circuit 100 shown in FIG. 4, the driver circuit 100 and the MZM 200 will be described with reference to the symbols shown in FIG. 4.

An output circuit 104b includes: transistor Q100 to Q103; a transistor Q104 having base terminal connected to a bias voltage Vcs, collector terminal connected to an emitter terminal of the input transistor Q100, Q102; resistors R102, R103; a PMOS transistor Q106 having gate terminal connected to a connection point of the resistors R102, R103, drain terminal connected to the collector of the output transistor Q101 (a output signal terminal Voutp in the positive side of the driver circuit 100), and source terminal connected to the power supply VCC; a PMOS transistor Q107 having gate terminal connected to the connection point of resistors R102, R103, drain terminal connected to the collector terminal (a output signal terminal Voutn in the negative side of the driver circuit 100) of the output transistor Q103, and source terminal connected to the power supply VCC; and a resistor 106 having one end connected to the connection point of resistors R102, R103 and the other end connected to ground.

The PMOS transistor Q106 constitutes a switch SW2 connected between a power supply voltage VCC and an output signal terminal Voutp. A PMOS transistor Q107 constitutes a switch SW3 connected between a power supply voltage VCC and an output signal terminal Voutn. The switch SW2 and SW3 are turned on when the connection point of the resistor R102 and R103 is floating or ground voltage, and turned off when the connection point of the resistor R102 and R103 is higher than the ground voltage. The resistors R102, R103, R106 and the switches SW2, RSW3 constitute a withstand voltage protection circuit 300a.

In this example, switches SW2, SW3 are provided for turning on/off the application of the power supply voltage VCC to the collector terminal of the output transistors Q101 and Q103, and the switch SW2 and SW3 are controlled according to the common voltage of the differential output signal terminals Voutp, Voutn (the output terminals Vop, Von of the output circuit 104b) of the driver circuit 100.

The withstand voltage protection of the present example functions as follows. For example, when only the power supply of the driver circuit 100 is on and the power supply of the MZM 200 is off, a differential output signal terminal Voutp and Voutn of the driver circuit 100 is a floating or ground voltage. In this state, since the control signal applied to the gate terminal of the PMOS transistors Q106 and Q107 become low, the PMOS transistors Q106 and Q107 become on. At this time, since a power supply voltage VCC is supplied to the collector terminal of the output transistors Q101 to Q103 and a current flows to the transistor Q100 to Q103 of the output circuit 104b, a voltage higher than the withstand voltage is not applied to the transistor Q100 to Q103.

When the power supply of the MZM 200 is turned on while the power supply of the driver circuit 100 is on, the common voltage of the differential output signal terminal Voutp and Voutn of the driver circuit 100 rises, and the control signal applied to the gate terminal of PMOS transistors Q106, Q107 becomes high, and the PMOS transistors Q106, Q107 becomes off. In this state, the collector terminal of the output transistor Q101 and Q103 is disconnected from the power supply voltage VCC, and the collector terminal of the output transistor Q101 and Q103 is returned to the open state. Since the power supply voltage of the output circuit 104b is supplied from the MZM 200 side and a current in normal operation flows to the transistor Q100 to Q103 of the output circuit 104b, a voltage higher than the withstand voltage is not applied to the transistor Q100 to Q103.

In this example, the power supply sequence can be simplified more than in the prior art. For example, an operation for turning on the power supply of the MZM 200 may be performed simply after turning on the power supply of the driver circuit 100. When the power supply is cut off, the power supply of the MZM 200 is turned off and then the power supply of the driver circuit 100 is turned off. Further, in the present example, since a complicated power supply control circuit or program is not required, the withstand voltage protection can be realized with a small area and at a low cost.

Third Example

Figure 3:
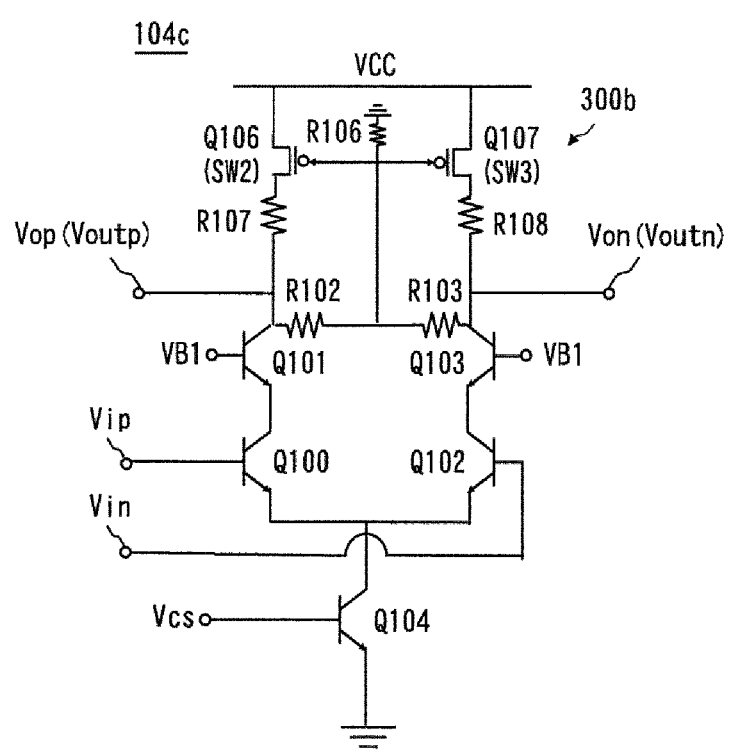
FIG. 3 is a view illustrating another a configuration of the output circuit of the driver to a third example of the present invention.

Next, a third example of the present invention will be described. FIG. 3 is a view illustrating a configuration of an output circuit of a driver circuit according to the third example of the present invention. In this example, since the driver circuit 100 shown in FIG. 4 uses an output circuit 104c instead of the output circuit 104, the driver circuit 100 and the MZM 200 will be described with reference to the reference numerals shown in FIG. 4.

In the output circuit 104c of the present example, resistors R107, R108 are inserted between the drain terminals of PMOS transistors Q106 and Q107 and the collector terminals of output transistors Q101 and Q103 in the output circuit 104b according to the second example.

A withstand voltage protection circuit 300b includes resistors R102, R103, R106 to R108 and switches SW2, SW3 (PMOS transistors Q106, Q107).

In the second example, when the power supply of the driver circuit 100 is on and the power supply of the MZM 200 is off, the power supply voltage VCC is applied to the collector terminal of the output transistor Q101 and Q103.

On the other hand, in this example, when the power supply of the driver circuit 100 is on and the power supply of the MZM 200 is off, since a voltage drop occurs in resistors R107, R108, a voltage applied to the collector terminal of the output transistors Q101, Q103 is lowered, and the effect of withstand voltage protection can be further increased.

Further, in this example, since resistors R107, R108 exist between the drain terminal of the PMOS transistor Q106 and Q107 and the differential output signal terminal Voutp and Voutn (collector terminal of the output transistor Q101, Q103) of the driver circuit 100, the influence of the parasitic capacitance of the PMOS transistors Q106 node Q107 added to the differential output signal terminal Voutp, Voutn becomes weaker than that of the second example, thus, the band of the driver circuit 100 in the normal operation can be widened.

The configurations of the withstand voltage protection circuit of the present invention are not limited to the first to third examples, as long as the withstand voltage protection circuit in which the current of the output circuit 104*a* to 104*c* is automatically controlled in accordance with the detected common voltage of the output circuit 104*a* to 104*c* as in the first to third examples.

INDUSTRIAL APPLICABILITY

The present invention can be applied to a driver circuit for driving an optical modulator.

REFERENCE SIGNS LIST

104*a* to 104*c* Output circuit
200 Mach-Zehnder optical modulator
300, 300*a*, 300*b* Withstand voltage protection circuit
Q100 to Q107 Transistor
R102 to R108 Resistor
SW1 to SW3 Switch

The invention claimed is:

1. A driver circuit comprising:
   an open collector type output circuit configured to drive an optical modulator connected to a first output signal terminal on a positive phase side and a second output signal terminal on a negative phase side of the driver circuit, wherein the open collector type output circuit includes:
   a first transistor and a second transistor having a base terminal to which a differential signal configured to drive the optical modulator is input;
   a third transistor having a base terminal connected to a first bias voltage, a collector terminal connected to the first output signal terminal, and an emitter terminal connected to a collector terminal of the first transistor;
   a fourth transistor having a base terminal connected to the first bias voltage, a collector terminal connected to the second output signal terminal, and an emitter terminal connected to the collector terminal of the second transistor;
   a fifth transistor having a collector terminal connected to emitter terminals of the first and second transistors, an emitter terminal connected to ground, the first transistor being configured to flow currents through the first, second, third, and fourth transistors in accordance with a second bias voltage applied to the base terminal; and
   a withstand voltage protection circuit configured to control currents flowing through the first, second, third and fourth transistors in accordance with a common voltage between the first output signal terminal and the second output signal terminal, wherein the withstand voltage protection circuit includes:
   first and second resistors connected in series between the first output signal terminal and the second output signal terminal, and
   a switch connected between the second bias voltage and the base terminal of the fifth transistor, and
   the switch is turned off when a connection point of the first and second resistors is a floating voltage or a ground voltage, and is turned on when the connection point of the first and second resistors is a voltage higher than the ground voltage.

2. The driver circuit according to claim 1, wherein the withstand voltage protection circuit further includes:
   a third resistor having one end connected to the connection point of the first and second resistors, and
   a fourth resistor having one end connected to the other end of the third resistor and the other end connected to ground, and
   the switch comprises an NMOS transistor having a gate terminal connected to a connection point of the third and fourth resistors, a drain terminal connected to the second bias voltage, and a source terminal connected to the base terminal of the fifth transistor.

3. A driver circuit comprising:
   an open collector type output circuit configured to drive an optical modulator connected to a first output signal terminal on a positive phase side and a second output signal terminal on a negative phase side of the driver circuit, wherein the open collector type output circuit includes:
   a first transistor and a second transistor having a base terminal to which a differential signal configured to drive the optical modulator is input;
   a third transistor having a base terminal connected to a first bias voltage, a collector terminal connected to the first output signal terminal, and an emitter terminal connected to a collector terminal of the first transistor;
   a fourth transistor having a base terminal connected to the first bias voltage, a collector terminal connected to the second output signal terminal, and an emitter terminal connected to the collector terminal of the second transistor;
   a fifth transistor having a collector terminal connected to emitter terminals of the first and second transistors, an emitter terminal connected to ground, the first transistor being configured to flow currents through the first, second, third, and fourth transistors in accordance with a second bias voltage applied to the base terminal; and
   a withstand voltage protection circuit configured to control currents flowing through the first, second, third and fourth transistors in accordance with a common voltage between the first output signal terminal and the second output signal terminal, wherein the withstand voltage protection circuit includes:

first and second resistors connected in series between the first output signal terminal and the second output signal terminal,
a first switch connected between a power supply voltage of the driver circuit and the first output signal terminal, and
a second switch connected between the power supply voltage and the second output signal terminal, and
the first and second switches are turned on when a connection point of the first and second resistors is a floating voltage or a ground voltage, and is turned off when the connection point between the first and second resistors is a voltage higher than the ground voltage.

4. The driver circuit according to claim 3, wherein:
the withstand voltage protection circuit further includes a third resistor having one end connected to the connection point of the first and second resistors and the other end connected to ground,
the first switch comprises a first PMOS transistor having a gate terminal connected to the connection point of the first and second resistors, a drain terminal connected to the first output signal terminal, and a source terminal connected to the power supply voltage, and
the second switch comprises a second PMOS transistor having a gate terminal connected to the connection point of the first and second resistors, a drain terminal connected to the second output signal terminal, and a source terminal connected to the power supply voltage.

5. The driver circuit according to claim 3, wherein the withstand voltage protection circuit further includes:
a fourth resistor connected between the first switch and the first output signal terminal, and
a fifth resistor connected between the second switch and the second output signal terminal.

6. An open collector type output circuit comprising:
a first transistor and a second transistor having a base terminal, a differential input signal connected to the base terminal;
a third transistor having a base terminal connected to a first bias voltage, a collector terminal connected to a first output signal terminal, and an emitter terminal connected to a collector terminal of the first transistor;
a fourth transistor having a base terminal connected to the first bias voltage, a collector terminal connected to a second output signal terminal, and an emitter terminal connected to the collector terminal of the second transistor;
a fifth transistor having a collector terminal connected to emitter terminals of the first and second transistors, an emitter terminal connected to ground, the first transistor being configured to flow currents through the first, second, third, and fourth transistors in accordance with a second bias voltage applied to the base terminal; and
a withstand voltage protection circuit configured to control currents flowing through the first, second, third and fourth transistors in accordance with a common voltage between the first output signal terminal and the second output signal terminal, wherein the withstand voltage protection circuit includes:
first and second resistors connected in series between the first output signal terminal and the second output signal terminal, and
a switch connected between the second bias voltage and the base terminal of the fifth transistor, and
the switch is turned off when a connection point of the first and second resistors is a floating voltage or a ground voltage, and is turned on when the connection point of the first and second resistors is a voltage higher than the ground voltage.

7. The open collector type output circuit according to claim 6, wherein the withstand voltage protection circuit further includes:
a third resistor having one end connected to the connection point of the first and second resistors, and
a fourth resistor having one end connected to the other end of the third resistor and the other end connected to ground, and
the switch comprises an NMOS transistor having a gate terminal connected to a connection point of the third and fourth resistors, a drain terminal connected to the second bias voltage, and a source terminal connected to the base terminal of the fifth transistor.

8. An open collector type output circuit comprising:
a first transistor and a second transistor having a base terminal, a differential input signal connected to the base terminal;
a third transistor having a base terminal connected to a first bias voltage, a collector terminal connected to a first output signal terminal, and an emitter terminal connected to a collector terminal of the first transistor;
a fourth transistor having a base terminal connected to the first bias voltage, a collector terminal connected to a second output signal terminal, and an emitter terminal connected to the collector terminal of the second transistor;
a fifth transistor having a collector terminal connected to emitter terminals of the first and second transistors, an emitter terminal connected to ground, the first transistor being configured to flow currents through the first, second, third, and fourth transistors in accordance with a second bias voltage applied to the base terminal; and
a withstand voltage protection circuit configured to control currents flowing through the first, second, third and fourth transistors in accordance with a common voltage between the first output signal terminal and the second output signal terminal, wherein the withstand voltage protection circuit includes:
first and second resistors connected in series between the first output signal terminal and the second output signal terminal,
a first switch connected between a power supply voltage of the open collector type output circuit and the first output signal terminal, and
a second switch connected between the power supply voltage and the second output signal terminal, and
the first and second switches are turned on when a connection point of the first and second resistors is a floating voltage or a ground voltage, and is turned off when the connection point between the first and second resistors is a voltage higher than the ground voltage.

9. The open collector type output circuit according to claim 8, wherein:
the withstand voltage protection circuit further includes a third resistor having one end connected to the connection point of the first and second resistors and the other end connected to ground,
the first switch comprises a first PMOS transistor having a gate terminal connected to the connection point of the first and second resistors, a drain terminal connected to the first output signal terminal, and a source terminal connected to the power supply voltage, and
the second switch comprises a second PMOS transistor having a gate terminal connected to the connection point of the first and second resistors, a drain terminal connected to the second output signal terminal, and a source terminal connected to the power supply voltage.

10. The open collector type output circuit according to claim 8, wherein the withstand voltage protection circuit further includes:
a fourth resistor connected between the first switch and the first output signal terminal, and
a fifth resistor connected between the second switch and the second output signal terminal.

11. The open collector type output circuit of claim 6, wherein the open collector type output circuit is configured to drive an optical modulator connected to the first output signal terminal on a positive phase side and the second output signal terminal on a negative phase side of a driver circuit.

* * * * *